(12) United States Patent
Perkins et al.

(10) Patent No.: US 10,880,528 B1
(45) Date of Patent: Dec. 29, 2020

(54) DEVICE, SYSTEM AND METHOD FOR MODULATING LIGHT USING A PHASE LIGHT MODULATOR AND A SPATIAL LIGHT MODULATOR

(71) Applicant: CHRISTIE DIGITAL SYSTEMS USA, INC., Cypress, CA (US)

(72) Inventors: Michael Perkins, Kitchener (CA); David Kiers, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 127 days.

(21) Appl. No.: 16/670,581

(22) Filed: Oct. 31, 2019

(51) Int. Cl.
*H04N 9/31* (2006.01)
*G02B 26/08* (2006.01)

(52) U.S. Cl.
CPC ....... *H04N 9/3126* (2013.01); *G02B 26/0816* (2013.01)

(58) Field of Classification Search
None
See application file for complete search history.

(56) References Cited

U.S. PATENT DOCUMENTS

| | | | |
|---|---|---|---|
| 9,372,472 B2 | 6/2016 | Guthrie et al. | |
| 9,983,545 B2* | 5/2018 | Gorny | G02B 26/0833 |
| 2003/0150917 A1* | 8/2003 | Tsikos | B82Y 15/00 |
| | | | 235/454 |
| 2007/0103768 A1* | 5/2007 | Blackham | H04N 9/3164 |
| | | | 359/355 |
| 2009/0115917 A1* | 5/2009 | Horikawa | G02B 26/0841 |
| | | | 348/745 |
| 2009/0165126 A1* | 6/2009 | Jung | G06Q 10/06 |
| | | | 726/21 |
| 2010/0002950 A1* | 1/2010 | Arieli | G01J 9/02 |
| | | | 382/255 |
| 2010/0079685 A1* | 4/2010 | Endo | C07D 213/85 |
| | | | 348/761 |

(Continued)

FOREIGN PATENT DOCUMENTS

WO 2019/060802 A1 3/2019

OTHER PUBLICATIONS

Damberg, Gerwin, "Computational Projection Display, Towards Efficient High Brightness Projection in Cinema", Thesis, The University of British Columbia, Vancouver, Canada, Jul. 2017.

*Primary Examiner* — Jefferey F Harold
*Assistant Examiner* — Mustafizur Rahman
(74) *Attorney, Agent, or Firm* — Perry + Currier, Inc.

(57) ABSTRACT

A device, system and method for modulating light using a phase light modulator (PLM) and a spatial light modulator (SLM). A device determines a target-destination wave, representative of an image, to be formed at an image plane of the PLM using image data, defining the image for projection, and a random seeding of spatial values of a spatially varying phase of the target-destination wave at the image plane, the image plane located between the PLM and SLM, the SLM and PLM arranged such that light reflected from the PLM illuminates the SLM. The device determines a target-source wave to be formed at the PLM, based on: a free space transfer function between the PLM and the image plane; and the target-destination wave. The device determines, from the target-source wave, a phase map for controlling the PLM to form the image. The device controls the PLM using the phase map.

20 Claims, 10 Drawing Sheets

(56) References Cited

U.S. PATENT DOCUMENTS

| | | | |
|---|---|---|---|
| 2011/0134344 A1* | 6/2011 | Marcus | H04N 9/3105 |
| | | | 348/752 |
| 2011/0149359 A1* | 6/2011 | Leister | G02B 27/46 |
| | | | 359/9 |
| 2011/0251905 A1* | 10/2011 | Lawrence | G03H 1/0005 |
| | | | 705/15 |
| 2012/0307250 A1* | 12/2012 | Wang | G01N 21/1717 |
| | | | 356/450 |
| 2013/0278840 A1* | 10/2013 | Jaynes | H04N 9/3185 |
| | | | 348/747 |
| 2013/0342665 A1* | 12/2013 | Wang | H04N 5/30 |
| | | | 348/61 |
| 2018/0007327 A1* | 1/2018 | Richards | G03B 21/2066 |
| 2018/0176519 A1 | 6/2018 | Damberg et al. | |
| 2018/0246325 A1 | 8/2018 | Frisken | |
| 2018/0270457 A1 | 9/2018 | Damberg et al. | |
| 2019/0306437 A1* | 10/2019 | Morales Delgado | H04N 5/33 |

* cited by examiner

DEVICE, SYSTEM AND METHOD FOR MODULATING LIGHT USING A PHASE LIGHT MODULATOR AND A SPATIAL LIGHT MODULATOR

BACKGROUND

Traditional image projection is an inherently inefficient subtractive process. For example light is generated and focused onto a spatial light modulator (e.g. digital micromirror devices, liquid crystal displays, liquid crystal on silicon etc.). However, the spatial light modulator uses only a portion of the light to generate an image, and a remaining portion of the light that is not used to generate the image is discarded, for example into a light dump. The efficiency of such a process may be around 10%, with 90% of the generated light being wasted. Such a process is inherently inefficient and, as the energy cost for operating high intensity light sources used in projection can be high, may lead to a waste of energy, excess heat, and the like.

BRIEF DESCRIPTIONS OF THE DRAWINGS

For a better understanding of the various examples described herein and to show more clearly how they may be carried into effect, reference will now be made, by way of example only, to the accompanying drawings in which.

Figure 1:
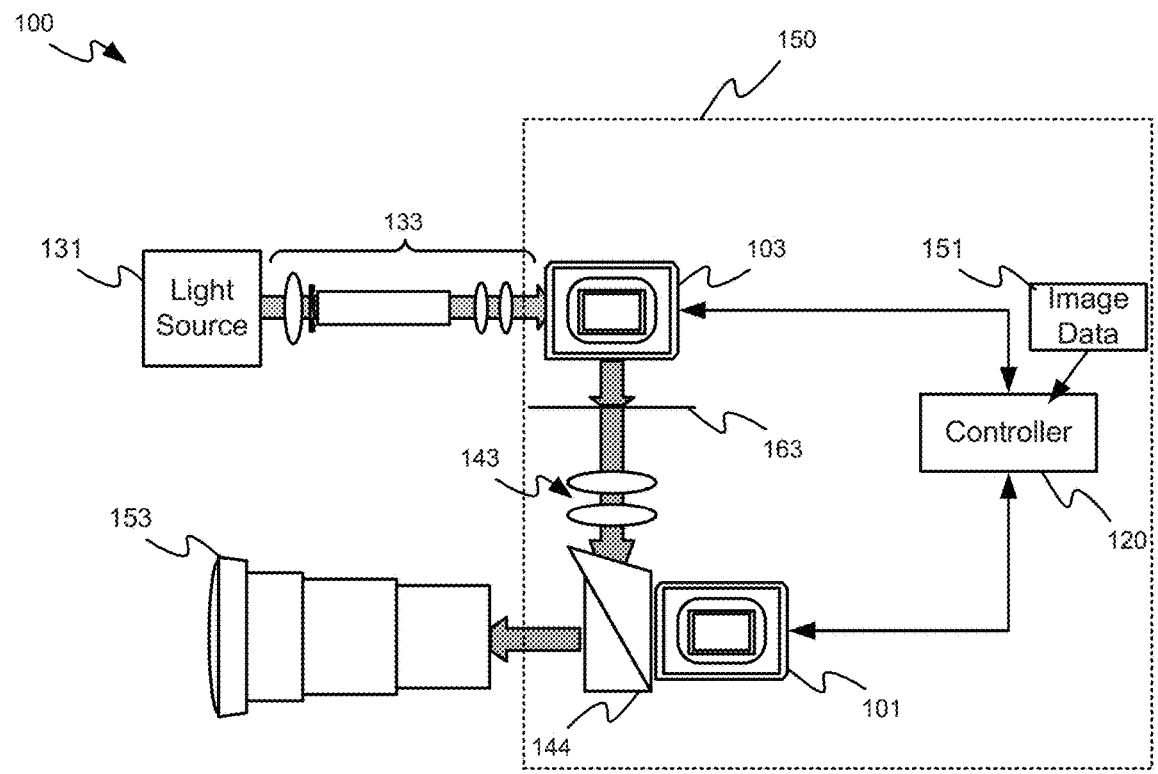
FIG. 1 depicts a device for modulating light using a phase light modulator and a spatial light modulator, according to non-limiting examples.
Figure 5:
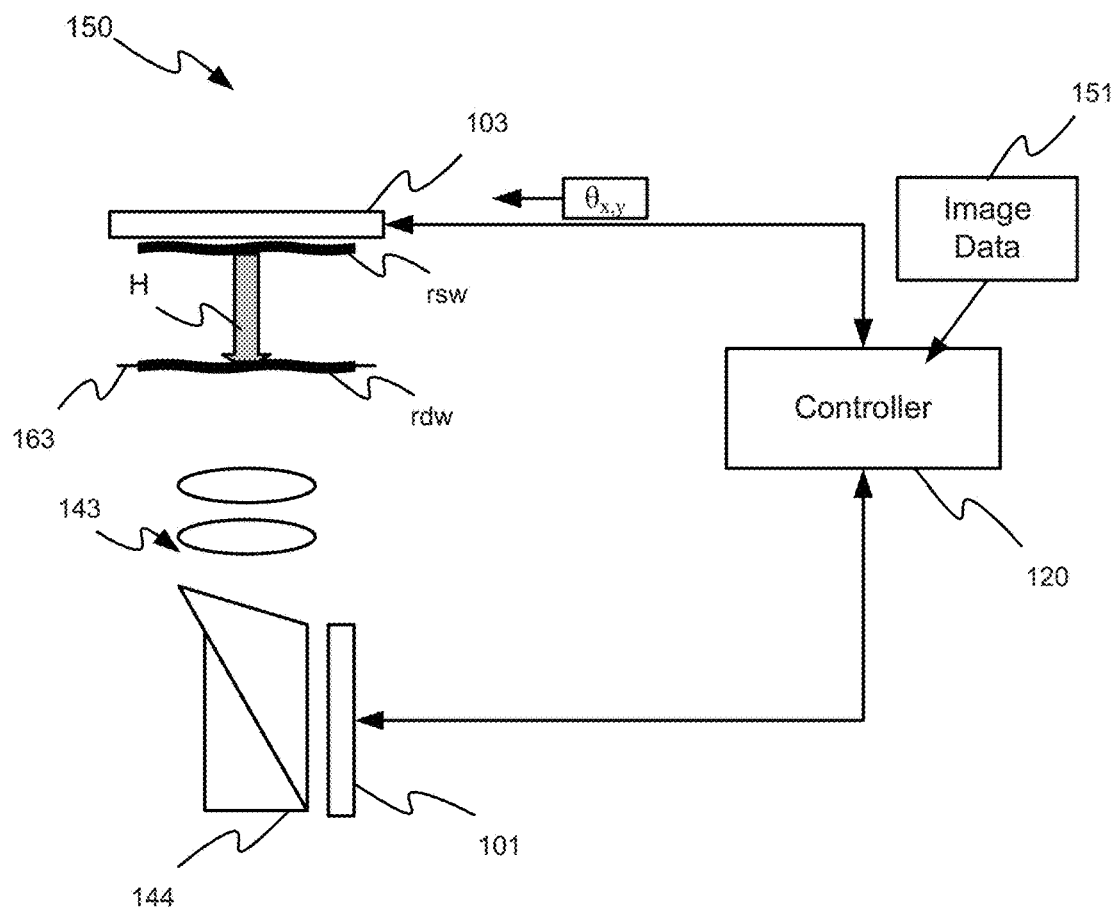

FIG. 5 continues the example of the method for modulating light using a phase light modulator and a spatial light modulator being implemented in the system of FIG. 1, according to non-limiting examples.

Figure 6:
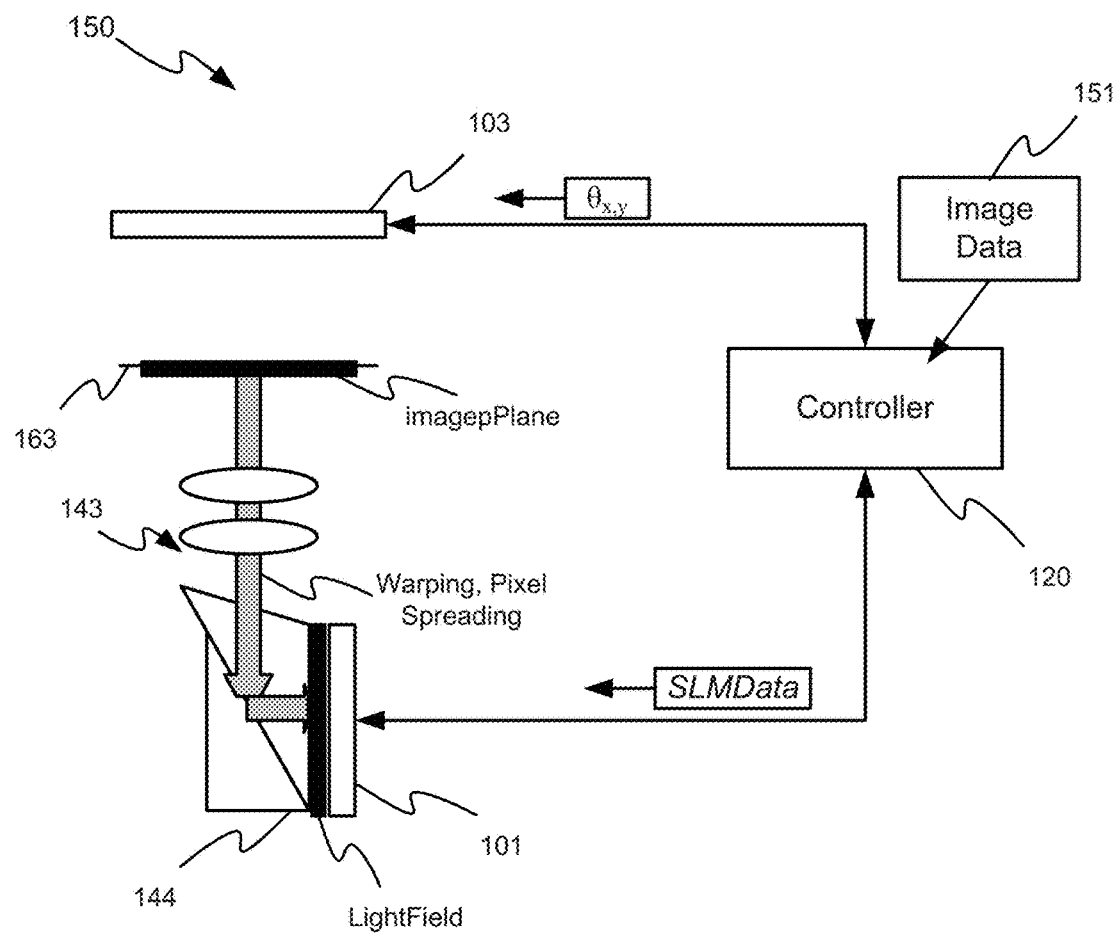

FIG. 6 continues the example of the method for modulating light using a phase light modulator and a spatial light modulator being implemented in the system of FIG. 1, according to non-limiting examples.

Figure 7:
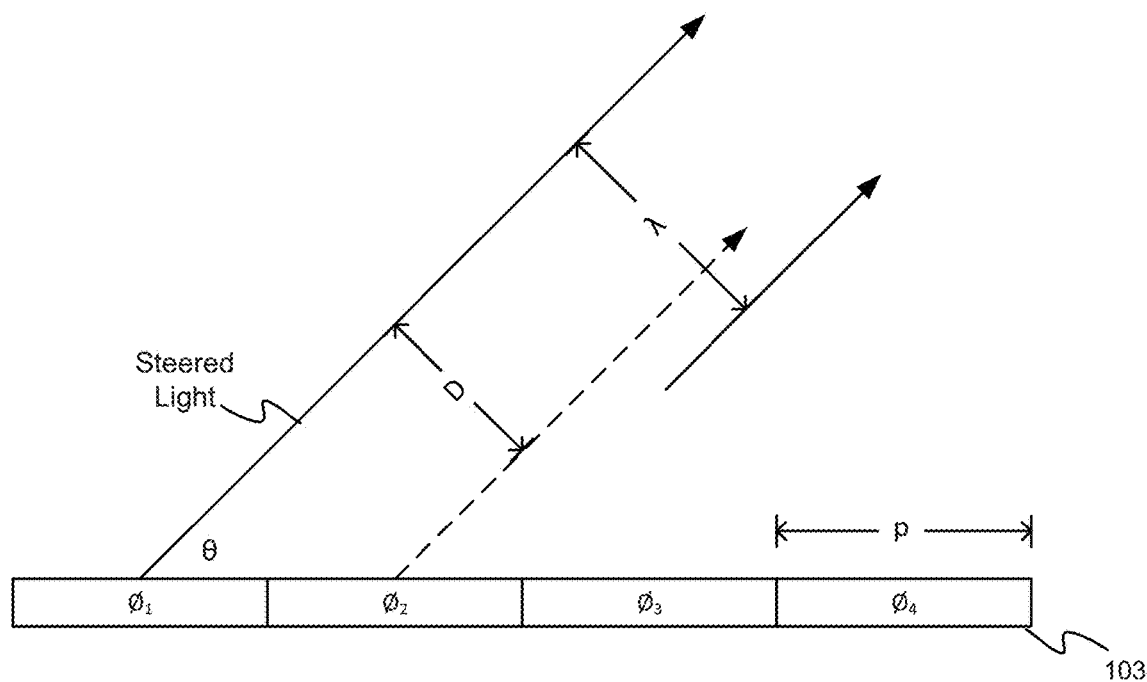

FIG. 7 depicts an example of determining an angle of steered light in four example pixels of a phase-only light modulator, according to non-limiting examples.

Figure 8:
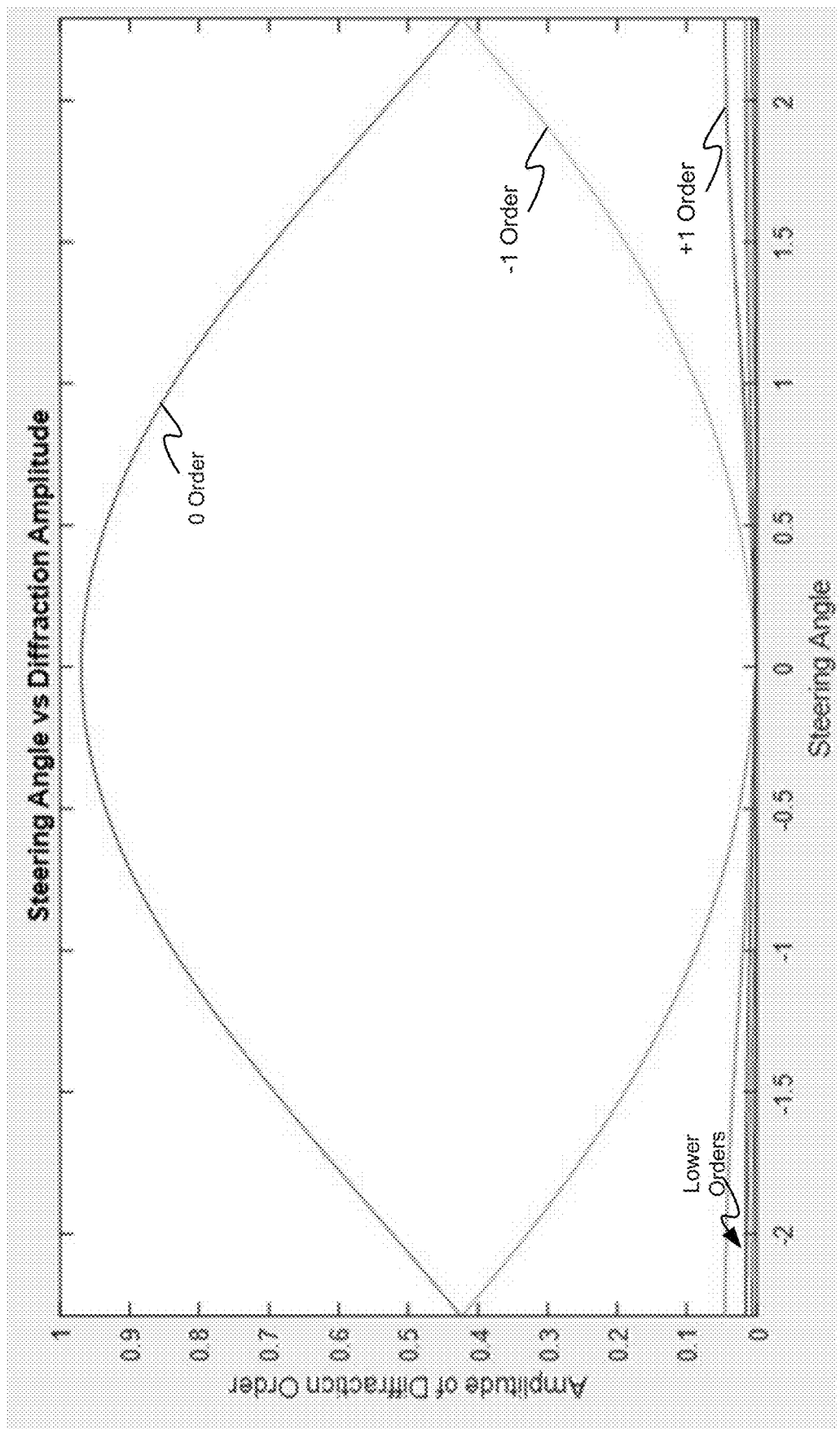

FIG. 8 depicts a graph of amplitude vs steering angle for different diffractive orders of red light at 640 nm, according to non-limiting examples.

Figure 9:
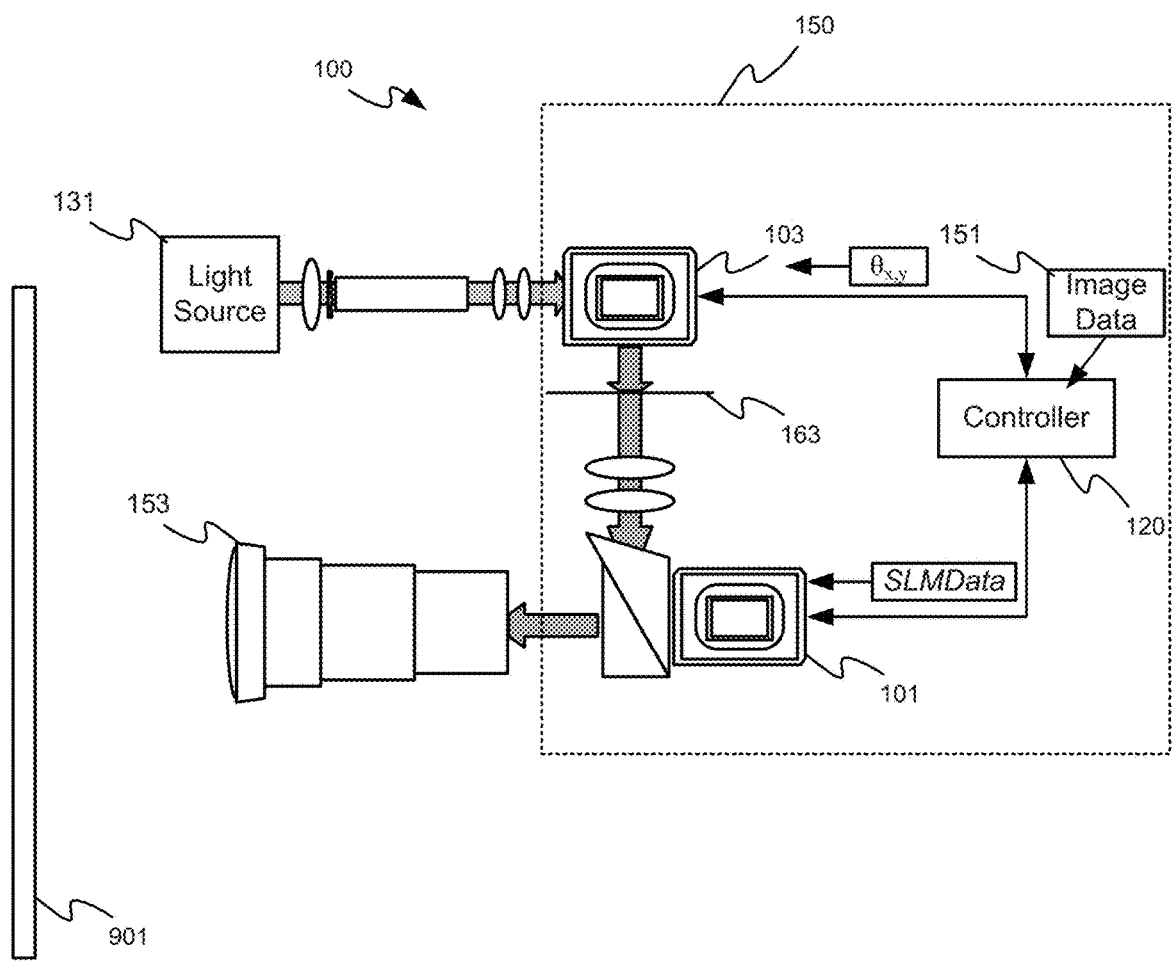

FIG. 9 depicts an example of the system of FIG. 1 being used as a cinema projector system, according to non-limiting examples.

Figure 10:
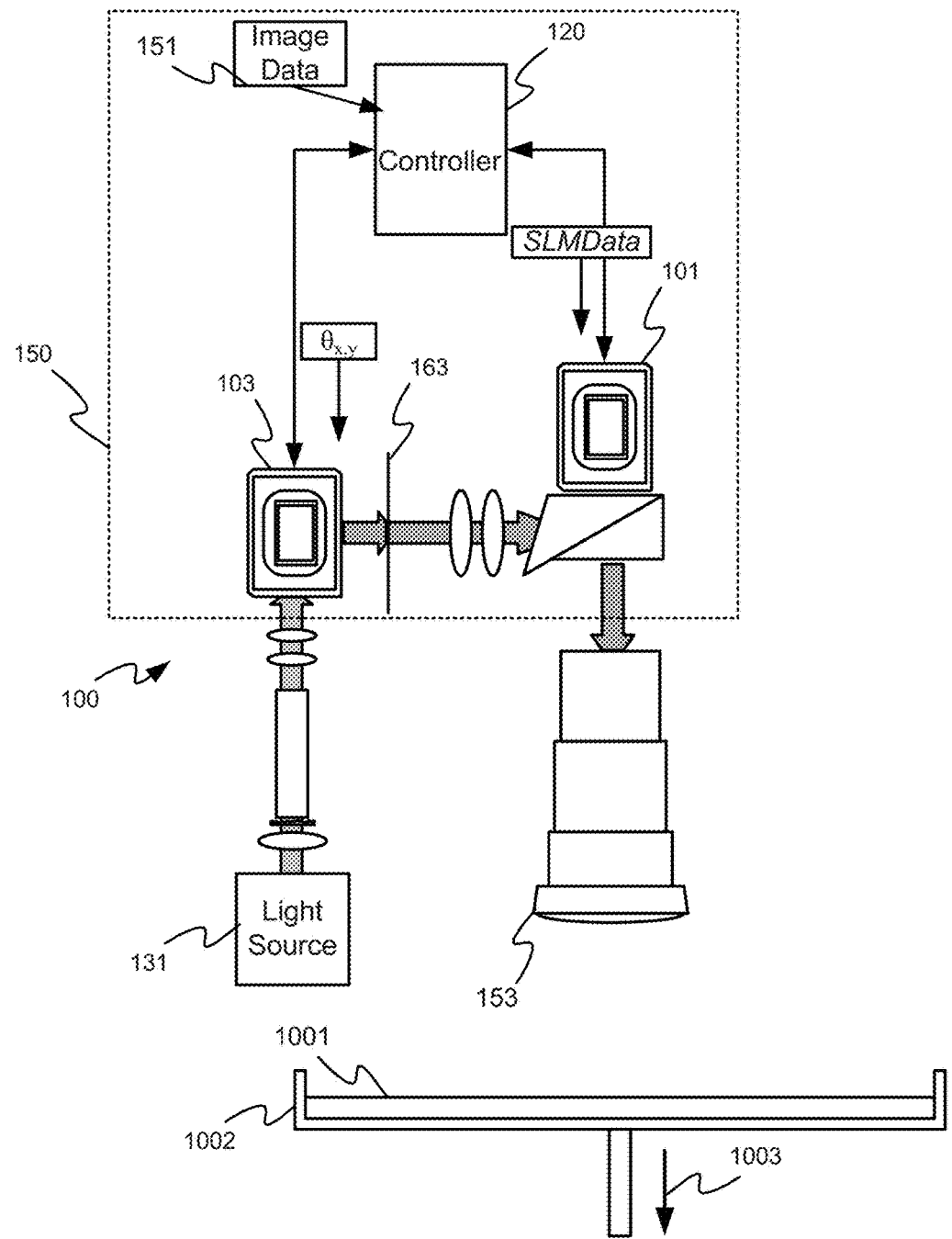

FIG. 10 depicts an example of the system of FIG. 1 being used as a three-dimensional printer light generation system, according to non-limiting examples.

DETAILED DESCRIPTION

Provided herein is a system and/or device which includes a spatial light modulator (SLM) and a phase light modulator (PLM) arranged such that light reflected from the PLM illuminates the SLM, for example in two-stage cascade architecture. The PLM is controlled as a pre-modulator to direct and/or steer light onto regions of the SLM where light is needed to form an image. Hence, less light is discarded than, for example, when another SLM is used as a pre-modulator. In particular, the PLM and the SLM are both controlled based on image data used to project an image; as will be described in more detail below, control of the PLM is further based on a novel variation of the Gerchberg-Saxton algorithm, and control of the SLM is further based on a novel light field estimation technique (e.g. an estimated light field for illuminating the SLM). Furthermore, the system and/or device as described herein may be used in any suitable application where light is to be projected. For example, the system and/or device as described herein may be adapted to project images onto a screen and hence used in a cinema projector system; in another example, the system and/or device as described herein may be adapted for three-dimensional printing techniques and hence used in a three-dimensional printer light generation system. However such a list is non-exhaustive, and the system and/or device as described herein may be adapted for any suitable application.

An aspect of the specification provides a device comprising: a spatial light modulator (SLM); a phase light modulator (PLM), the SLM and the PLM arranged such that light reflected from the PLM illuminates the SLM; and a controller having access to image data defining an image for projection, the controller configured to: determine a target-destination wave, representative of the image, to be formed at an image plane of the PLM using the image data and a random seeding of spatial values of a spatially varying phase of the target-destination wave at the image plane, the image plane located between the PLM and the SLM; determine a target-source wave to be formed at the PLM, based on: a free space transfer function between the PLM and the image plane; and the target-destination wave; determine, from the target-source wave, a phase map for controlling the PLM to form the image; and control the PLM using the phase map.

Another aspect of the specification provides a method comprising: determining, at a device, a target-destination wave, representative of an image, to be formed at an image plane of phase light modulator (PLM) using image data, the image data defining the image for projection, and a random seeding of spatial values of a spatially varying phase of the target-destination wave at the image plane, the image plane located between the PLM and spatial light modulator (SLM), the SLM and the PLM arranged such that light reflected from the PLM illuminates the SLM; determining, at the device, a target-source wave to be formed at the PLM, based on: a free space transfer function between the PLM and the image plane; and the target-destination wave; determining, at the device, from the target-source wave, a phase map for controlling the PLM to form the image; and controlling, at the device, the PLM using the phase map.

Another aspect of the specification provides a non-transitory computer-readable medium storing a computer program, wherein execution of the computer program is for: determining, at a device, a target-destination wave, representative of an image, to be formed at an image plane of phase light modulator (PLM) using image data, the image data defining the image for projection, and a random seeding of spatial values of a spatially varying phase of the target-destination wave at the image plane, the image plane located between the PLM and spatial light modulator (SLM), the SLM and the PLM arranged such that light reflected from the PLM illuminates the SLM; determining, at the device, a target-source wave to be formed at the PLM, based on: a free space transfer function between the PLM and the image plane; and the target-destination wave; determining, at the device, from the target-source wave, a phase map for controlling the PLM to form the image; and controlling, at the device, the PLM using the phase map.

FIG. 1 depicts a system 100 for modulating light comprising: a spatial light modulator (SLM) 101; a phase light modulator (PLM) 103 and a controller 120 in communication with the SLM 101 and the PLM 103 via any suitable wired and/or wireless communication links (depicted in FIG. 1, and throughput the present specification as double-ended arrows). As depicted, the system 100 further comprises a light source 131 for illuminating the PLM 103, for example via integration and/or illumination optics 133. In general, the SLM 101 and the PLM 103 are arranged such that light reflected from the PLM 103 illuminates the SLM 101, for example via relay optics 143, and which may include a prism assembly 144 configured to convey illumination light to the SLM 101 and convey modulated light to projection optics 153. Light in FIG. 1, and throughout the application is depicted as arrows (e.g. shaded arrows) between components of the system 100. Furthermore, while the optics 133, 143, 153 are not described in detail herein, any suitable optics are within the scope of the present specification.

Certain components of the system 100 may be provided as a device 150; for example, as depicted, the SLM 101, the PLM 103, the controller 120 and the relay optics 143 may be provided as an integrated device 150, with the light source 131, and the optics 133, 153 provided as separate devices. Alternatively, the various components of the system 100 may be provided in any suitable combination of devices. For example, the SLM 101, the PLM 103, and the relay optics 143 may be provided as an integrated device and the controller 120 may be provided in a stand-alone computing device in communication with the SLM 101 and the PLM 103, The components of the device 150 are next described.

The SLM 101 may comprise any suitable spatial light modulator including, but not limited to, a digital micromirror device (DMD), a liquid crystal device (LCD), a liquid crystal on silicon (LCOS) device, and the like. In general, the SLM 101 spatially modulates light in a subtractive manner, as described above.

In contrast to the SLM 101, the PLM 103, which may alternatively be referred to as a phase-only light modulator, modulates light according to phase. Put another way, pixels of the PLM 103 convey light in a common direction, but the pixels of the PLM 103 may be controlled to change a phase of respective light conveyed therefrom and relative to neighboring pixels. Put another way, the phase of light conveyed by (and/or reflected by) the PLM 103 spatially varies across the PLM 103.

One class of such a phase-only light modulator are phase-only light modulator LCOS devices. Such phase-only light modulator LCOS devices generally have a large array of individually addressable pixels and can be controlled to apply a local electrical field to a given pixel independent of the electrical field applied to neighboring pixels. Incident light will pass through the LCD material of the LCOS device, reflect off the bottom of the device, pass through the LCD material a second time and then leave the device. The optical path length of such light, for the individual pixels, depends on the index of refraction of the LCD material for a pixel, which will in turn depend on the locally applied electrical field of the pixel. This causes the exiting light wave to have a spatially varying phase pattern. By selection of pixel values, the spatial variation in phase will result in both constructive and destructive interference.

Another class of phase-only light modulator comprises an array of micromachined optical mirrors connected to respective actuators. In this class of phase-only light modulator, the mirrors are connected to respective piston-like structures which are attached to a base. Hence, such phase-only light modulators generally have a large array of individually addressable pixels and can be controlled to apply a local voltage to a given pixel independent of the voltage applied to neighboring pixels. An applied voltage actuates a piston-like structure of a pixel to displace a mirror of the pixel vertically, relative to the base (e.g. perpendicular to the base). As each mirror (e.g. pixel) in the array is independently addressable and moveable, the optical path length of an incident beam of light will vary spatially across the phase-only light modulator, resulting in a spatially varying phase pattern, similar to that of phase-only light modulator LCOS devices described above.

While two examples of a phase-only light modulator are described, the PLM 103 may comprise any suitable of phase-only light modulator, and/or any suitable of phase-only light modulator is within the scope of the present specification.

Regardless of the class of the phase-only light modulator of the PLM 103, the PLM 103 may be controlled, for example, by the controller 120, to modulate light to generate a spatially varying phase pattern that results in bright and dark regions corresponding to the bright and dark regions of a target image. For example, as depicted, the controller 120 generally has access to image data 151 defining an image for projection. Indeed, the PLM 103 may colloquially be described as steering light from dark regions of a target image (e.g. defined by the image data 151) to bright regions of the target image; such a process attempts to use as much of the light illuminating the PLM 103 to form an image, in contrast to the subtractive processes used by the SLM 101. Hence, when light modulated by the PLM 103 illuminates the SLM 101, which is controlled to form the target image, the bright and dark regions are illuminated accordingly and, while the process at the SLM 101 is subtractive, there is less light lost and/or discarded in the system 100 than if the PLM 103 were replaced by a pre-modulator SLM.

In particular, the PLM 103 may be controlled to form a destination wave (e.g. a phase-modulated version of light formed into an image represented by the image data 151) at an image plane 163 located between the PLM 103 and the relay optics 143. A distance between the image plane 163 and the relay optics 143 (e.g., a first lens and/or component of the relay optics 143) may be selected, as described below, with a configuration of the relay optics 143 and other components of the system 100, selected accordingly.

In some examples, the image data 151 may define an image for projection by a cinema projector system, and the like, such as a frame (and/or frames) of a movie and/or a video. Indeed, the image data 151 may be received in a stream of video frames, for example from a video source having a given video source frame rate. However, in other examples, the image data 151 may define a layer (and/or layers) of a three-dimensional printed object, and the image data 151 may comprise a three-dimensional printing file, and the like. In some examples, the image data 151 may be predefined, in the case of an existing video file and/or three-dimensional printing file, and/or the image data 151 may be generated "on the fly" by a rendering device and/or a content player, and the like.

The bandwidth of the light source 131 may also depend on the application with which the system 100 is being used. For example, when the system 100 is being used with a cinema projector system, and the like, the bandwidth of the light source 131 may be in human-visible wavelengths (e.g. red and/or green and/or blue). Similarly, when the system 100 is being used a with a three-dimensional printer, and the like, the bandwidth of the light source 131 may be in ultraviolet wavelengths which may be used to polymerize and/or solidify a liquid polymer. However, any suitable range of bandwidth of the light source 131 is within the scope of the present specification. In particular, as described below, the light source 131 may comprise a laser light source and hence may be generally monochromatic.

Similarly, the configuration of the projection optics 153 may also depend on the application with which the system 100 is being used. For example, when the system 100 is being used in cinema projector system, a focal length, and the like, of the projection optics 153 may be compatible with projecting images onto a screen in a theater, and the like. Similarly, when the system 100 is being used with a three-dimensional printer light generation system, a focal length, and the like, of the projection optics 153 may be compatible with projecting images onto a liquid polymer, and the like; for example, in such applications the focal length, and the like, of the projection optics 153 may be much shorter for three-dimensional printing than with cinema projection. However, any suitable configuration of the projection optics 153 is within the scope of the present specification.

Figure 2:
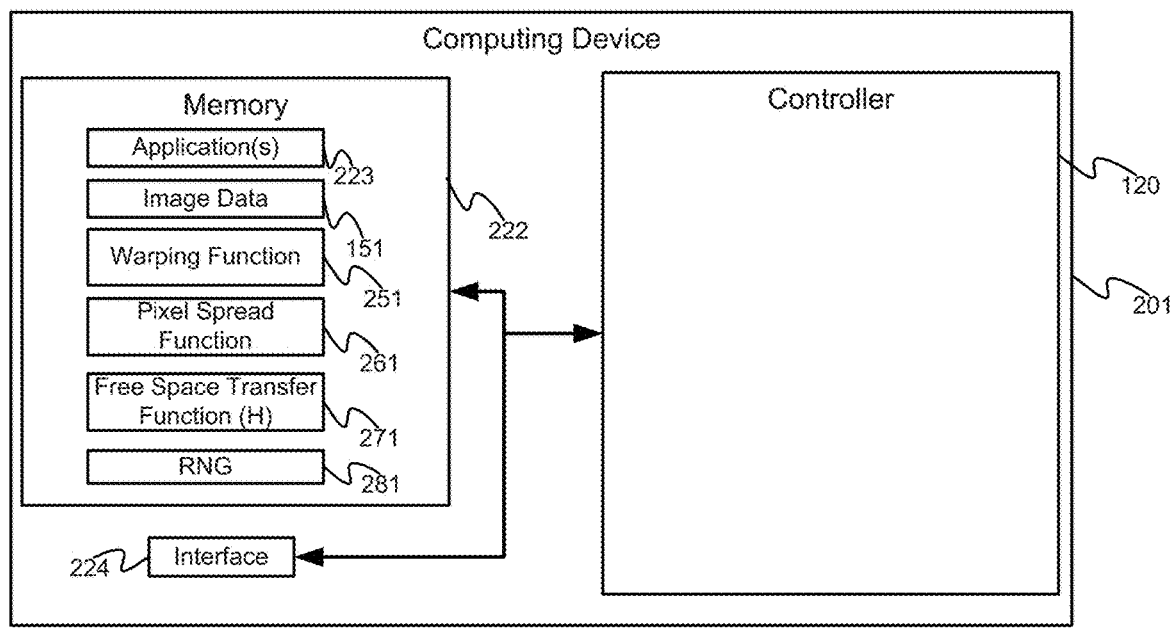
FIG. 2 depicts a block diagram of a computing device used with the system of FIG. 1, according to non-limiting examples.

Attention is next directed to FIG. 2 which depicts a computing device 201 of which the controller 120 may be a component. In particular, while in FIG. 1 the controller 120 is depicted as stand-alone device, the controller 120 may be a component of the computing device 201, which in turn may be a component of the device 150. However, in other examples, the computing device 201 (and hence the controller 120) may be external to the device 150. Indeed, the computing device 201 and/or the controller 120 may be provided in any suitable manner with the system 100 adapted accordingly.

The computing device 201, can comprise any suitable computing device, including but not limited to a graphics processing unit (GPU), a graphics processing device, a graphics processing engine, a video processing device, a personal computer (PC), a server, and the like. As depicted, the computing device 201 may comprise: the controller 120; a memory 222 storing one or more applications 223 and optionally the image data 151; and a communication interface 224. While the memory 222 is depicted as internal to the computing device 201, the memory 222 may be external to the computing device 201 and the controller 120 may have access to the memory 222 via the interface 224.

As depicted, the memory 222 may further store a warping function 251 that represents one or more of: spatial image transformation; keystoning; image rotation; and magnification that may occur in the system 100, for example due to a geometric and/or optical relationship between the PLM 103 and the SLM 101 (and/or a surface onto which the projection optics 153 projects (e.g. a screen, a liquid polymer surface, and the like)). In particular, SLM data used to control the SLM 101, described in more detail below, may be determined, at least in part, using the warping function 251, for example when estimating a light field that illuminates the SLM 101.

Similarly, as depicted, the memory 222 may further store a pixel spread function 261. For example, the relay optics 143, between the image plane 163 and the SLM 101, may contribute, at least in part, to spreading of pixels of modulated light as the modulated light travels through space (e.g. between the image plane 163 and the SLM 101). The pixel spread function 261 may represent such a spread. Put another way, the relay optics 143 may contribute, at least in part, to the pixel spread function 261 between the image plane 163 and the SLM 101, and the pixel spread function 261 may be used to determine SLM data for controlling the SLM 101, for example when estimating a light field that illuminates the SLM 101.

As depicted, the memory 222 may further store a free space transfer function (H) 271, which may be used to determine how a wave will propagate from a source to a destination, and described in more detail below.

The warping function 251 and/or the pixel spread function 261 and/or the free space transfer function 271 may be predetermined and stored at the memory 222.

As depicted, the memory 222 may further store a random number generator (RNG) 281 which may be used by the controller 120 to generate random numbers (and/or pseudo-random numbers) and the like.

While the functions 251, 261, 271 and the RNG 281 are depicted as being stored separately from the application 223, one or more of the functions 251, 261, 271 and the RNG 281 may be components of the application 223.

While the image data 151 is depicted as being stored at the memory 222, the image data 151 may optionally be received from another device including, but not limited to, a rendering device and/or a content player, and/or another memory accessible to the controller 120 (e.g. a removeable memory, such as a memory stick, and the like, inserted into a compatible port (not depicted) of the computing device 201 and/or another memory, external to the computing device 201, and accessible to the controller 120 via the interface 224).

Each of the one or more applications 223 may be similar, but used for a different mode of the system 100. For example, in one mode, SLM data may be generated non-iteratively, while, in another mode, SLM data may be generated iteratively; such modes are described below. For simplicity, the one or more applications 223 will be interchangeably referred to hereafter as the application 223.

The interface 224 comprises any suitable wired or wireless communication interface configured to communicate with the SLM 101 and the PLM 103. The interface 224 may communicate in a wired and/or wireless manner as desired including, but not limited to using cables, WiFi communication links, Bluetooth™ communication links, communication networks, personal area networks, local area networks, and the like.

The controller 120 can comprise a processor and/or a plurality of processors, including but not limited to one or more central processors (CPUs) and/or one or more graphics processing units (GPUs) and/or one or more processing units; either way, the controller 120 comprises a hardware element and/or a hardware processor. Indeed, in some implementations, the controller 120 can comprise an ASIC (application-specific integrated circuit) and/or an FPGA (field-programmable gate array) specifically configured for modulating light using a phase light modulator and a spatial light modulator. Hence, the controller 120 and/or the computing device 201 may not be a generic controller and/or computing device, but a device specifically configured to implement specific functionality for modulating light using a phase light modulator and a spatial light modulator. For example, the controller 120 and/or the computing device 201 can specifically comprise a computer executable engine configured to implement functionality for modulating light using a phase light modulator and a spatial light modulator.

The memory 222 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the computing device 201 as described herein are typically maintained, persistently, in the memory 222 and used by the controller 120 which makes appropriate utilization of volatile storage during the execution of such programming instructions. Those skilled in the art recognize that the memory 222 is an example of computer readable media that can store programming instructions executable on the controller 120. Furthermore, the memory 222 is also an example of a memory unit and/or memory module and/or a non-volatile memory.

In particular, the memory 222 stores the application 223 that, when processed by the controller 120, enables the controller 120 and/or the computing device 201 to: determine a target-destination wave, representative of an image, to be formed at the image plane 163 of the PLM 103 using the image data 151 and a random seeding of spatial values of a spatially varying phase of the target-destination wave at the image plane 163, the image plane 163 located between the PLM 103 and the SLM 101; determine a target-source wave to be formed at the PLM 103, based on: a free space transfer function 271 between the PLM 103 and the image plane 163; and the target-destination wave; determine, from the target-source wave, a phase map for controlling the PLM 103 to form the image; and control the PLM 103 using the phase map.

It is further understood that the application 223 that, when processed by the controller 120, may further enable the controller 120 and/or the computing device 201 to: determine a real-source wave, representative of an actual source wave formed by the PLM 103 when controlled using the phase map, the real-source wave determined using the phase map; determine a real-destination wave formed at the image plane 163 due to the real-source wave propagating through space to the image plane 163, the real-destination wave based on: the free space transfer function 271 between the PLM 103 and the image plane 163; and the real-source wave; determine a spatially varying representation of the real-destination wave; determine SLM data for controlling the SLM 101 based on: the image data 151; the spatially varying representation of the real-destination wave; and a pixel spread function representing pixel spread between the image plane 163 and the SLM 101;

and control the SLM 101 using the SLM data.

Hence, control of the SLM 101 and the PLM 103 may be determined with respective to wave optics; indeed, hereafter, control of the SLM 101 and the PLM 103 will be described with respect to target waves and real waves. Such waves generally comprise spatially varying phase patterns produced by the PLM 103, and the term "wave" may be interchangeably replaced with the term "spatially varying phase pattern" throughout the present specification. Furthermore, the term "target waves", as used herein, refers to modelled ideal determined waves that the system 100 may attempt to form at various locations with respect to the PLM 103 and image plane 163, while the term "real waves", as used herein, refer to modelled actual waves that may be formed at the various locations with respect to the PLM 103 and image plane 163. Each may be determined programmatically using models to control the PLM 103 and the SLM 101, as described below, and while, ideally the target waves are the same as the real waves, differences therebetween may occur due to imperfections in modeling the target waves and the real waves, inherent physical limitations of the PLM 103 (e.g. pixel resolution, bit depth, and the like). Further differences between the target waves and the real waves are described below.

Figure 3:
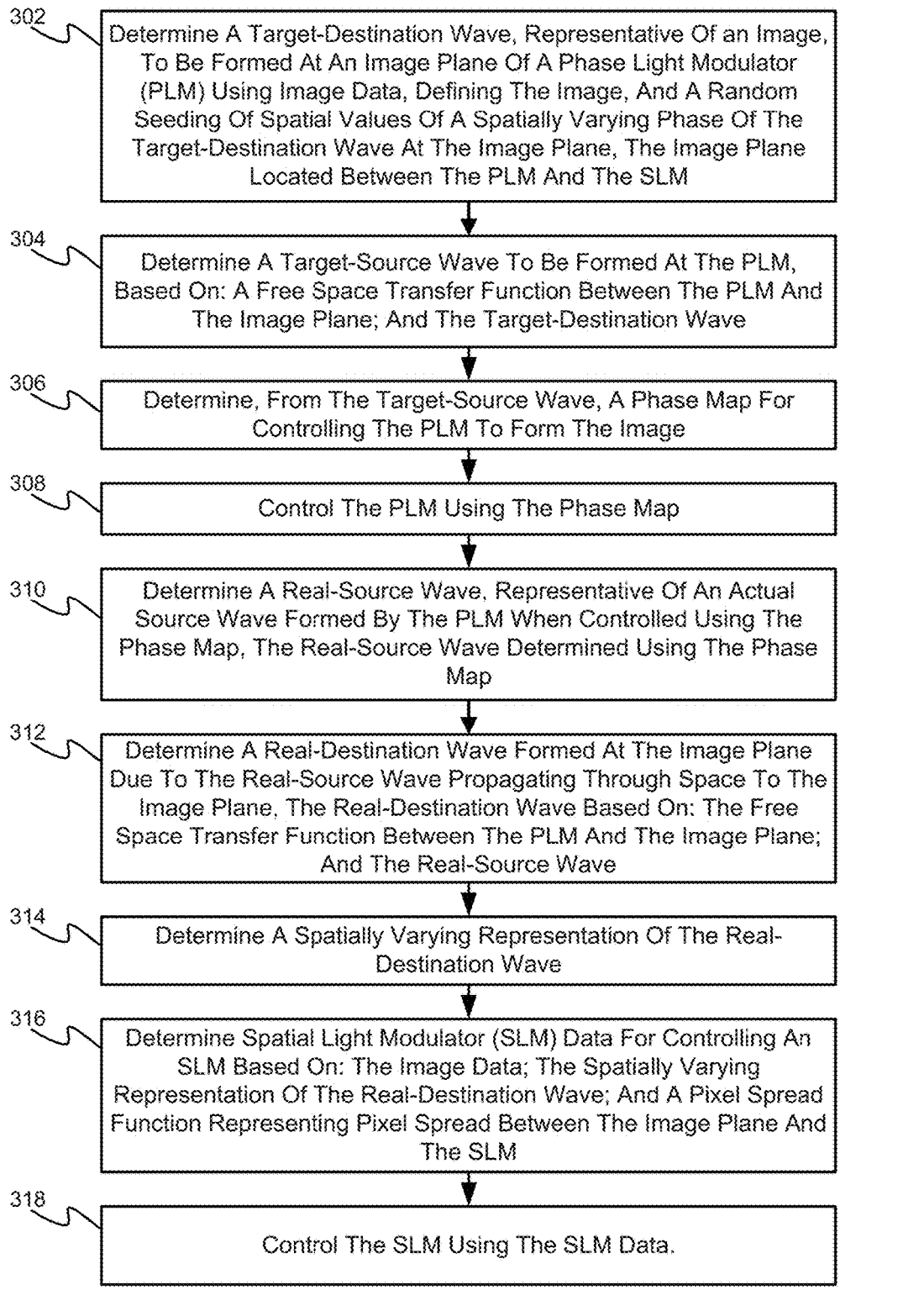
FIG. 3 depict a flowchart of a method for modulating light using a phase light modulator and a spatial light modulator, according to non-limiting examples.

Attention is now directed to FIG. 3 which depicts a flowchart representative of a method 300 for modulating light using a phase light modulator and a spatial light modulator. The operations of the method 300 of FIG. 3 correspond to machine readable instructions that are executed by the controller 120 and/or the computing device 201. In the illustrated example, the instructions represented by the blocks of FIG. 3 are stored at the memory 222 for example, as the application 223. The method 300 of FIG. 3 is one way in which the controller 120 and/or the computing device 201 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 120 and/or the computing device 201 determines a target-destination wave, representative of an image, to be formed at the image plane 163 of the PLM 103 using the image data 151 and a random seeding of spatial values of a spatially varying phase of the target-destination wave at the image plane 163, the image plane 163 located between the PLM 103 and the SLM 101. In general, spatially varying amplitude of target-destination wave is generally representative of spatially varying image intensity of an image formed at the image plane 163. The spatial values of the spatially varying phase may be generated by the RNG 281; for example, for each pixel of the PLM 103, the RNG 281 may be used to generate a random phase value; such random phase values may be bounded by, for example, 0 radians and a radians. However, the random seeding of the spatial values of a spatially varying phase of the target-destination wave at the image plane 163 may occur in any suitable manner, for example using another process for seeding the spatial values other than the RNG 281.

At a block 304, the controller 120 and/or the computing device 201 determines a target-source wave to be formed at the PLM 103, based on: the free space transfer function 271 between the PLM 103 and the image plane 163; and the target-destination wave. The controller 120 and/or the computing device 201 further determine the free space transfer function 271 based on a distance between the PLM 103 and the image plane 163; in particular, the free space transfer function 271 may comprise specific numerical values based, at least in part, on the distance between the PLM 103 and the image plane 163; such numeric values may be determined by the controller 120 and/or the computing device 201 and/or such numeric values may be predetermined; regardless the numeric values may be stored at the memory 222 as the free space transfer function 271.

At a block 306, the controller 120 and/or the computing device 201 determines, from the target-source wave, a phase map for controlling the PLM 103 to form the image.

At a block 308, the controller 120 and/or the computing device 201 controls the PLM 103 using the phase map.

Hence, the block 302, the block 304, the block 306 and the block 308 may be used to control the PLM 103.

At a block 310, the controller 120 and/or the computing device 201 determines a real-source wave, representative of an actual source wave formed by the PLM 103 when controlled using the phase map, the real-source wave determined using the phase map.

At a block 312, the controller 120 and/or the computing device 201 determines a real-destination wave formed at the image plane 163 due to the real-source wave propagating through space to the image plane 163, the real-destination wave based on: the free space transfer function between the PLM 103 and the image plane 163; and the real-source wave.

At a block 314, the controller 120 and/or the computing device 201 determines a spatially varying representation of the real-destination wave.

At a block 316, the controller 120 and/or the computing device 201 determines SLM data for controlling the SLM 101 based on: the image data 151; the spatially varying representation of the real-destination wave; and a pixel spread function 261 representing pixel spread between the image plane 163 and the SLM 101. Indeed, the spatially varying representation of the real-destination wave; and the pixel spread function 261 representing pixel spread between the image plane 163 and the SLM 101 may be used to estimate a light field illuminating the SLM 101. The SLM data may be further based on the warping function 251 that represents one or more of: spatial image transformation; keystoning; image rotation; and magnification in the system 100. Hence, the warping function 251 may also be used to estimate a light field illuminating the SLM 101. The light field may be combined with the image data 151 to generate the SLM data, as described in more detail below.

At a block 318, the controller 120 and/or the computing device 201 controls the SLM 101 using the SLM data.

Hence, the block 310, the block 312, the block 314, the block 316 and the block 318 may be used to control the SLM 101.

As depicted, the method 300 is described with respect to a mode in which the SLM data is generated non-iteratively.

However, in another mode, SLM data may be generated iteratively. For example, the controller 120 and/or the computing device 201 may iteratively repeat, for example iteratively determining the real-destination wave until one or more of: a predetermined number of iterations occurs; and an error function is less than a threshold value. For example, the controller 120 and/or the computing device 201 may not initially implement the block 308, the block 316 and the block 318; rather, the controller 120 and/or the computing device 201 may iteratively repeat the blocks 302, 304, 306, 310, 312, 314. When the block 302 is repeated, the controller 120 and/or the computing device 201 may again determine the target-destination wave using the image data 151, but with spatial values of the spatially varying phase determined using the real-destination wave (e.g. as previously determined at the block 314) instead of random seeding. At the block 306, the target-source wave may again be determined but using the target-destination wave, as again determined using the real-destination wave. The method 300 may continue until the real-destination wave is again determined, for one or more of predetermined number of iterations and/or until an error function is less than a threshold value; examples of such an error function are described in more detail below.

An example of the method 300 is next described.

One of the challenges presented by any PLM is diffraction. The pixelated structure of a PLM inherently acts as a blaze grating, diffracting light from the light source 131 in two dimensions. In some prior art approaches to beam steering (e.g. binary phase holograms using a spatial light modulator) this is accepted as an unavoidable loss in efficiency. In the example described hereafter, however, the diffractive effects may be considered and used, for example, to improve efficiency of the system 100.

In the present example, an image is formed a "short" distance in front of the PLM 103, at the image plane 163. This image at the image plane 163 may be referred to in the present example as the "Premod" image (e.g. pre-modulator image). The relay optics 143 are generally configured to relay the Premod image to the SLM 101. The Premod image will have a physical size approximately equivalent to an active area of the PLM 103. If the PLM 103 and SLM 101 have different physical "XY" dimensions, then the relay optics 143 will be configured to provide an appropriate level of magnification, for example as defined by the warping function 251.

The distance of the image plane 163 from the PLM 103 may be selected such that most of the light diffracted by the PLM 103 may be within an active image area at the image plane 163, and therefore diffracted light may be used for imaging at the SLM 101.

For example, a distance between the image plane 163 and the PLM 103 may be selected such that both a central diffractive order and at least one further diffractive order of the PLM 103 are located within one or more of: a field of view of the relay optics 143; and within an active portion of an image as formed at the relay optics 143 by the PLM 103. An example of such a selection is described below with respect to FIG. 7 and FIG. 8. However, the distance between the image plane 163 and the PLM 103 may be selected in any suitable manner.

Regardless of how the distance between the image plane 163 and the PLM 103 is selected, as diffraction is a known and predictable effect, it can be incorporated into the programmatic determination of a phase map that may be used to drive the PLM 103.

In wave optics, a wave at a "destination" location may be determined using a convolution of the wave at a "source" location with a free space transfer function, which may be determined in the Fourier domain as follows:

$$\text{destination} = \text{FFT}^{-1}\{\text{FFT}(\text{source}) * H\} \quad \text{Equation (1)}.$$

In Equation (1) "H" may be numerical values of the free space transfer function 271. Such numerical values may be determined using the following:

$$H = e^{-i2\pi d \sqrt{\frac{1}{\lambda^2} - v_x^2 - v_y^2}} \quad \text{Equation (2)}$$

In Equation (1) and Equation (2), and hereafter, FFT refers to a two-dimensional Fourier transform operator (e.g. a Fast Fourier Transform), FFT$^{-1}$ refers an inverse of the-dimensional Fourier transform operator, d is the distance from destination to source (e.g. a distance from the PLM 103 to the image plane 163, λ is the wavelength of light being steered (e.g. a wavelength of light of the light source 131), and $v_x$ and $v_y$ are the spatial frequencies in two dimensions in the frequency domain of the wave produced, for example by the PLM 103. Determination of $v_x$ and $v_y$ are described in more detail below with respect to FIG. 7.

It is further understood that Equation (1) is "time reversible" such that:

$$\text{source}=\text{FFT}^{-1}\{\text{FFT}(\text{destination})*H^*\} \quad \text{Equation (3)}.$$

In Equation (3), H* is the complex conjugate of H (i.e. the numerical values of the free space transfer function 271).

In many real-world projection applications, the light source 131 may be narrow band (e.g. close to monochromatic). For example, the light source 131 may comprise a laser light source of any suitable wavelength depending on an application, as described above. Although not perfectly monochromatic, laser light sources are generally narrow banded enough that they may be modelled as monochromatic, and hence a wavelength "λ" of equations used herein may be a single value.

In wave optics, a wave may be specified by its amplitude, phase, and wavelength. Given that the wavelength may be assumed herein to be a fixed, single value, a description of waves described herein may be simplified by referring to amplitude and phase with the wavelength being implicit.

In particular, the following waves may be considered:

Target-Source Wave (tsw)—in the following discussion, this refers to a modelled ideal wave at the PLM 103 (e.g. the PLM 103 is a "source" of a wave).

Real-Source Wave (rsw)—in the following discussion, this refers to a modelled actual wave at the PLM 103 (e.g. Real-Source Wave would ideally be the same as the Target-Source Wave).

Target-Destination wave (tdw)—in the following discussion, this refers to a modelled ideal wave at the image plane 163 (e.g. due the Target-Source Wave propagating through space to the image plane 163).

Real-Destination Wave (rdw)—in the following discussion, this refers to a modelled actual wave at the image plane 163 (e.g. due the Real-Source Wave propagating through space to the image plane 163; ideally the Real-Source Wave would be the same as the Target-Source Wave).

From wave optics, it is understood that an amplitude of a wave is equal to the square root of an intensity of the wave. In general, the Target-Destination Wave should match the image that is being generated by the PLM 103 such that:

$$tdw=\sqrt{\text{Image}}*e^{i\varnothing_{x,y}} \quad \text{Equation (4)}.$$

In Equation (4), tdw comprises a two-dimensional array (e.g. x,y array) representing the Target-Destination Wave (e.g. at the image plane 163), Image is a corresponding two-dimensional array representing a target image to be formed at the image plane 163 by the PLM 103 (and which may be determined using the image data 151, with intensity of each x,y pixel of the image data 151 indicating an intensity of an image), and $\varnothing_{x,y}$ represents a spatially varying phase map of the Target-Definition Wave at a given x,y pixel of the Target-Destination Wave. For example, the phase map $\varnothing_{x,y}$ may comprise phase values for each "xy" pixel of the Target-Destination Wave. Initially the phase map $\varnothing_{x,y}$ is unknown, however the phase map $\varnothing_{x,y}$ of the Target-Destination Wave may be randomly seeded using the RNG 281, and the like. For example, using a variation on the Gerchberg-Saxton algorithm, each "x,y" position of the phase map $\varnothing_{x,y}$ may be randomly assigned a radian value in the interval 0 to 2π (and/or a corresponding voltage value). Note that the resolution of the target Image (e.g. the resolution of the image data 151) may match the spatial resolution of the SLM 101; when the resolution of the PLM 103 and the SLM 101 are different, the controller 120 and/or the computing device 201 may be configured to convert between the resolutions, for example with respect to the target Image and the phase map $\varnothing_{x,y}$. In particular examples, the two-dimensional array, target Image is generally generated such that the resolution of the two-dimensional array, target Image, matches the resolution of the PLM 103, and the image data 151 may match the resolution of the SLM 101; when there is a mismatch between the SLM 101 and the PLM 103, the computing device 201 may convert the resolution of the image data 151 to the resolution of the PLM 103 when generating the two-dimensional array, target Image (and/or the computing device 201 converts the resolution of the two-dimensional array, target Image to the resolution of the PLM 103).

From the numerical values of the free space transfer function (e.g. determined using Equation (2)), the Target-Source Wave be determined using (e.g. a variation of Equation (3)):

$$tsw=\text{FFT}^{-1}\{\text{FFT}(tdw)*H^*\} \quad \text{Equation (5)}.$$

In Equation (5), tsw comprises a two-dimensional array representing the Target-Source Wave. In general, with reference to FIG. 4, which depicts the device 150, with the SLM 101 and the PLM 103 represented schematically, the Equation (5) represents a "backwards in time" propagation through space of the Target-Destination Wave (tdw) from the image plane 163 to the Target-Source Wave (tsw) at the PLM 103. Put another way, the Target-Destination Wave may be determined (e.g. at the block 302 of the method 300) using the image data 151 and a random seeding of spatial values of the spatially varying phase $\varnothing_{x,y}$. Similarly, the Target-Source Wave may be determined (e.g. at the block 304 of the method 300) based on the free space transfer function 271 (e.g. a conjugate H*thereof) and the Target-Destination Wave.

As described above, the Target-Source Wave represents an ideal wave formed by the PLM 103, and the Real-Source Wave represents an actual wave formed by the PLM 103. Assuming the light source 131 is monochromatic, uniform and approximately collimated, then the amplitude of the Real-Source Wave may be modeled as unity (e.g. the amplitude of pixels of the Real-Source Wave formed by the PLM 103 may be "forced" to "1", even as the phases of the pixels are different). However, after propagation through space to the image plane 163, the amplitude of the pixels changes due to interference due to the differences in phase, forming an image at the image plane 163. The spatial phase of the Real-Source Wave may hence be strictly dependent on a phase map used to control the PLM 103. For example, such a two-dimensional phase map, $\theta_{x,y}$, may be determined from:

$$\theta_{x,y} = \tan^{-1} \frac{\text{Imag}(tsw)}{\text{Real}(tsw)} \quad \text{Equation (6)}$$

In Equation (6), Imag(tsw) is an imaginary component of the Target-Source Wave, and Real (tsw) is a real component of the Target-Source Wave; Equation (6) hence determines an arctangent of their ratio. Equation (6) may represent a simplified determination of phase angles of the Real-Source Wave formed by the PLM 103. In particular, differences between the Target-Source Wave and the Real-Source Wave are generally due to the ability of the PLM 103 to reproduce a desired phase, such as the phase determined using Equation (6); in particular, while Equation (6) produces a continuous "ideal" result for forming the Target-Source Wave, as the PLM 103 is digitally controlled and/or inherently quantized, the Real-Source Wave represents an attempt to form the "ideal" Target-Source Wave. Hence, in particular, the phase map $\theta_{x,y}$ may be converted from a continuous phase map, computing device 201 may convert the phase map $\theta_{x,y}$ to a digital and/or quantized version, and the like, for example having a same resolution as the PLM 103.

Regardless, the phase map $\theta_{x,y}$ for controlling the PLM 103 to form an image may be determined (e.g. at the block 306 of the method 300) from the Target-Source Wave. Furthermore, the phase map $\theta_{x,y}$ may be used (e.g. at the block 308 of the method 300) to control the PLM 103 to form the Real-Source Wave. For example, the digital version of the phase map $\theta_{x,y}$ may comprise phase values for each "xy" pixel of the PLM 103 and/or voltage values for driving each "xy" pixel of the PLM 103 to achieve a respective phase value.

Hence, Equations (1)-(6) may be used to control the PLM 103.

In order to determine the SLM data to apply to the SLM 101, an estimation of the Light Field (LF) illuminating that SLM 101 may be determined. Hence control of the SLM 101 is next described with reference to such a "Light Field Estimation".

In a traditional single stage modulator projector, a light field illuminating a light modulator is usually assumed to be uniform and data used to drive a light modulator therefore corresponds to a desired image in a direct fashion. In the cascaded architecture of the system 100 and/or the device 150, the light field illuminating the SLM 101 depends on the Premod image formed by the premodulator PLM 103 at the image plane 163 (e.g. as represented by the Real-Target Wave), the characteristics of the relay optics 143 (e.g. as represented, at least in part, by the pixel spread function 261), and the physical orientation of the PLM 103 and the SLM 101 (e.g. as represented, at least in part, by the warping function 251).

When the relay optics 143 conveys the Premod image (e.g. as represented by the Real-Target Wave) formed at the image plane 163 to the SLM 101 (e.g. to illuminate the SLM 101), some amount of distortion will occur. This distortion can be separated into two distinct categories—optical and spatial. The optical category includes blurring due to defocus, point spread function, coma, spherical aberration, and the like. The optical distortions in the system 100 and/or the device 150 may be measured and embodied as the pixel spread function 261.

Spatial distortions may include magnification, keystone, pincushion and barrel distortion and the like. For example, ideally, the PLM 103 and SLM 101 will be perfectly aligned with each other. However, in general, the PLM 103 and SLM 101 are not perfectly aligned. Rather, mechanical and optical tolerances in manufacturing the system 100 and/or the device 150 may generally result in some degree of rotation and offset, resulting in keystone errors. Although it may be possible to correct for these errors with mechanical alignment stages, such an approach may add cost and complexity to the system 100. Furthermore, the relay optics 143 may introduce spatial distortions such as pincushion and/or barrel distortions. Designing optics free of these distortions may be possible, but can be very challenging and expensive. The spatial distortions in the system 100 and/or the device 150 may be measured and embodied as the warping function 251.

Keeping such corrections in mind (and which may be optional, for example in an ideal system and/or near-ideal system), SLM data used to drive the SLM 101 may be determined as next described.

Starting with digital and/or quantized version of the phase map $\theta_{x,y}$ (e.g. as determined from Equation (6)), and assuming that the amplitude of pixels of the Real-Source Wave are all unity), the Real-Source Wave may be determined from (e.g. at the block 310 of the method 300):

$$rsw = e^{i\theta_{x,y}} \qquad \text{Equation (7)}$$

rsw comprises a two-dimensional array representing the Real-Source Wave as determined from the phase map $\theta_{x,y}$.

The Real-Destination Wave may be determined from (e.g. at the block 312 of the method 300) (e.g. a variation of Equation (3)):

$$rdw = \text{FFT}^{-1}\{\text{FFT}(rsw)*H\} \qquad \text{Equation (8)}$$

rdw comprises a two-dimensional array representing the Real-Destination Wave.

In general, with reference to FIG. 5, which depicts the device 150, with the PLM 103 represented schematically, Equation (8) represents a "forwards in time" propagation through space of the Real-Source Wave (rsw) at the PLM 103 to the Real-Destination Wave (rdw) at the image plane 163, for example when the controller 120 controls the PLM 103 to form the Real-Source Wave using the phase map, $\theta_{x,y}$.

A spatially varying representation of the Real-Destination Wave may be determined from (e.g. at the block 314 of the method 300):

$$\text{imagePlane} = |rdw|^2 \qquad \text{Equation (9)}$$

For example, Equation (9) represents intensity of light of the Real-Destination Wave. In particular, imagePlane comprises a two-dimensional array representing a spatially varying representation (e.g. a two-dimensional array of intensity) of the Real-Destination Wave (i.e. the phase information is removed from the Real-Destination Wave using Equation (9)).

The light field illuminating the SLM 101 may be determined by convolution of the imagePlane with the pixel spread function 261, and further using the warping function 251 to warping of the light field, as follows:

$$\text{LightField} = \text{Warp}(\text{FFT}^{-1}\{\text{FFT}(\text{imagePlane})* \text{FFT}(psf)\}) \qquad \text{Equation (10)}$$

In Equation (10), LightField represents a two-dimensional array of amplitude of light illuminating the SLM 101, Warp represents the warping function 251 and psf represents the pixel spread function 261. Indeed, from Equation (10), and as previously described, it is understood that the functions 251, 261 may comprise respective two-dimensional arrays of numerical values determining the imagePlane of Equation (9) due to warping and pixel spread, as described above.

SLM data, used to control the SLM 101, may be determined from (e.g. at the block 316 of the method 300):

$$\text{SLMData} = \text{Image}/\text{LightField} \qquad \text{Equation (11)}$$

In Equation (11), SLMData is a two-dimensional array of values used to drive the SLM 101, and Image comprises the image data 151. Hence, in general, the SLMData is determined by dividing the image data 151 by the light field as determined using Equation (10).

This process is depicted in FIG. 6 in which the imagePlane propagates to the SLM 101 via the relay optics 143 during which warping and pixel spreading occurs to illuminate the SLM 101 via the LightField. However, the SLMData is determined by the controller 120 and used to drive the SLM 101. The SLMData may be provided in the form of, for example, bitplane data for driving the SLM 101 and/or any other suitable format. An image formed by the SLM 101 modulating the light illuminating the SLM 101 is projected by the projection optics 153.

In general, as the image data 151 may represent, at least in part, a single frame of video, the phase map $\theta_{x,y}$ and the SLMData may be determined for each frame of the video and used to respectively and simultaneously drive the PLM 103 and the SLM 101. Hence, Equations (7)-(11) may be used to control the SLM 101.

The example described above with reference to FIG. 4, FIG. 5 and FIG. 6 may be further refined.

For example, the SLM data generated as described above may have an error that is random in nature due to the phase map $\emptyset_{x,y}$ being seeded with random numbers; such error may appear as high frequency noise in a projected image. However, when the PLM 103 is a high speed phase-only modulator, the PLM 103 may be driven a plurality of times using a plurality of phase maps $\theta_{x,y}$ generated from a corresponding plurality of phase maps $\emptyset_{x,y}$ within a time period for a single frame. The random errors of the multiple phase patterns tend to cancel each other out, which may reduce the apparent noise in the projected image. Furthermore, the PLM 103 may comprise a high speed phase-only modulator when the PLM 103 is generally configured to operate at a frame rate above a flicker threshold of a human vision system; for example, the PLM 103 may comprise a high speed phase-only modulator when the PLM 103 is configured to operate at greater than, or equal to, 120 Hz. In some examples, the PLM 103 is generally configured to operate at a frame rate that is an integer multiple of a video source frame rate (e.g. a rate at which frames (including the image data 151) of video is received).

Furthermore, the relay optics 143 can also be configured to have a relatively large pixel spread function 261. For example, the pixel spread function 261 may be considered "relatively large" when a single "source" pixel of the image plane 163 spreads across an area on the SLM 101 such that the 99% of the energy of that source pixel spreads (e.g. due the pixel spread function 261) to covers an area at the SLM 101 that greater than, or equal to, about 50 SLM pixels in diameter. Indeed, when the shape of the pixel spread function 261 is approximately gaussian, then the relay optics 143 may act as a low pass filter which will remove most of the high frequency noise from the random seed error.

Figure 4:
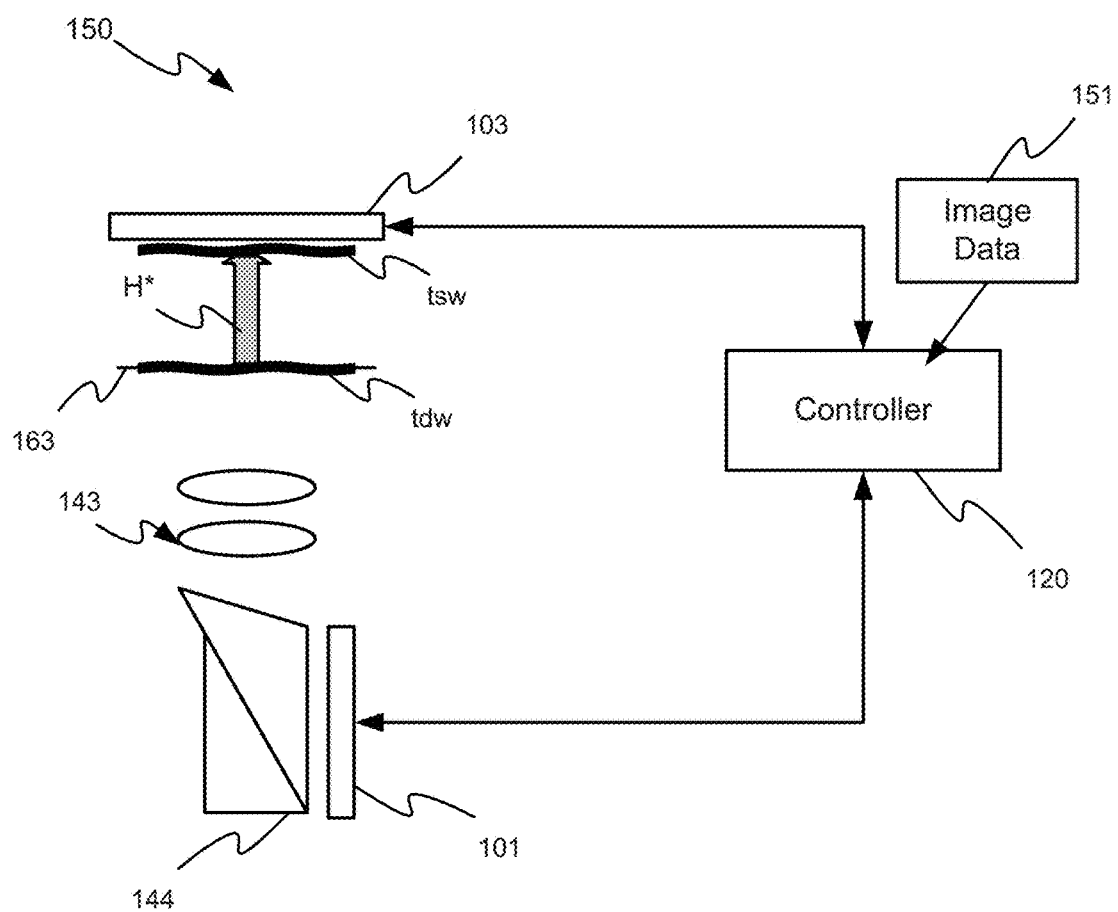
FIG. 4 depicts an example of a method for modulating light using a phase light modulator and a spatial light modulator being implemented in the system of FIG. 1, according to non-limiting examples.

Furthermore in the example described with respect to FIG. 4, FIG. 5 and FIG. 6, generation of the phase map $\theta_{x,y}$ and the SLM data is non-iterative. However, in other examples (e.g. another mode), the phase map $\theta_{x,y}$ and the SLM data may be iteratively determined to reduce error in the system 100.

For example, in a first iteration, the phase $\emptyset_{x,y}$ of Equation (4) may be randomly seeded as described above, and Equation (5), Equation (6), Equation (7) and Equation (8) may be used by the controller 120 and/or the computing device 201 to determine the Real-Destination Wave. Once the Real-Destination Wave is determined than the Target-Destination Wave may be redetermined using;

$$tdw = \sqrt{\text{Image}} * \frac{rdw}{|rdw|} \quad \text{Equation (12)}$$

Put another way, the Target-Destination Wave may be redetermined by combining the amplitude of the desired image with a "best guess phase" of the phase of the Real-Destination Wave (e.g.

$$\frac{rdw}{|rdw|}$$

The Target-Destination Wave determined using Equation (12) may be used as input to Equation (5) to again determine the Target-Source Wave, and Equation (6), Equation (7) and Equation (8) may be used to again determine the Real-Destination Wave, which may again be used, via Equation (12) to again determine the Target-Destination Wave in another iteration, to again determine the Real-Destination Wave. In other words, once the Target-Destination Wave is determined using Equation (4), the controller 120 may implement Equation (5), Equation (6), Equation (7), Equation (8), and Equation (12) in a loop for any suitable number of iterations.

In some examples, the number of iterations of the loop may be fixed and/or given number of iterations, for example, to allow for a known processing load and/or delay (e.g. based on speed and processing resources of the system 100). Alternatively, in other examples, the error between the amplitude squared of the rsw can be compared to the desired image (e.g. as represented by the image data 151) to get an error metric as follows:

$$\text{ErrorMetric} = \Sigma \sqrt{|rdw|^2 - |\text{Image}|^2} \quad \text{Equation (13)}$$

The loop can be continued until the error metric reaches a minimum threshold value and/or a given number of iterations occurs. However, an error metric may be determined in any suitable manner including, but not limited to, using peak signal-to-noise ratio (PSNR), a structural similarity (SSIM) index, and the like.

In any event, once iterations of the loop complete, the SLM Data may be determined using the last determined Real-Destination Wave, as described above.

Determination of numerical values of the free space transfer function 271, H, used in Equation (1), Equation (2), Equation (3), Equation (5) and Equation (8) is next described. In the following discussion the free space transfer function 271, H will interchangeably be referred as the kernel H. The kernel H may generally have dimensions larger than the resolution of the PLM 103. For example, propagating light wave will generally expand in size as it moves away from the PLM 103. As such, a light field at the image plane 163 will be larger than that of the PLM 103, and hence the kernel H may generally have dimensions larger than the resolution of the PLM 103 to account for the expansion of the light field. In some examples, the image data 151 may be "padded" with a black boundary (e.g. the computing device 201 may add black boundary pixels the image data 151 prior to determining the two-dimensional array, target Image. Indeed, an amount of expansion may be determined from:

$$\text{Expansion} = \frac{d * \lambda}{pixSize^2} \quad \text{Equation (14)}$$

In Equation (14), Expansion comprises a unitless indication of the expansion (which may be greater than 1), d comprises distance from the PLM 103 to the image plane 163 (e.g. as in Equation (2), λ comprises the wavelength of light from the light source 131, and pixSize comprises a pixel pitch of the PLM 103. The dimensions used in the following discussion may also be expanded per the Equation (14) to allow for an expanded light field size at the image plane 161 relative to the PLM 103.

In some examples, the kernel H may be determined as follows:

First, the following values may be determined:
hRes=Horizontal Resolution of the PLM 103.
vRes=Vertical Resolution of the PLM 103.
λ=mean wavelength of light from the light source 131.
pixSize=a pixel pitch of the pixels of PLM 103 (e.g. similar to Equation (14).
d=distance from PLM 103 to virtual image.

The following code snipped may be used to determine the kernel H:

For y=0 to vRes-1
For x=0 to hRes-1

$$v_x = \frac{((2x/hRes) - 1)}{((pixSize/2))}$$

$$v_y = \frac{((2y/hRes) - 1)}{((pixSize/2))}$$

$$H(x, y) = e^{-i2\pi d \sqrt{\frac{1}{\lambda^2} - v_x^2 - v_y^2}}$$

End (e.g. end "x" loop);
End (e.g. end ("y") loop);

However, this approach may fail to account for the effects of diffraction.

For example, the PLM 103 generally comprises an array of pixels which may be independently controlled to apply a phase shift to the incident light of at least ±π radians. This may enable generation of a wave front by the PLM 103 as described above. In practice the pixelated nature of the PLM 103 may lead to a reconstructed sampled wave front which may impose a Nyquist limit to how accurately the shape of a wave front generated by the PLM 103 may be controlled. The net effect may be to limit the maximum steering angle achievable (e.g. how far light from one pixel may be "steered" to other pixels).

For example, attention is directed to FIG. 7 which depicts four example pixels of the PLM 103, arranged in a line, each pixel driven to a respective phase $Ø_1$, $Ø_2$, $Ø_3$, $Ø_4$. In FIG. 7 it is understood that light is to be steered by the depicted pixels to a steering angle of θ degrees, the pixels have a "size" and/or pitch (e.g. in FIG. 7, for simplicity, a linear dimension) of "p", and that the wavelength of light in use is k. In the following example, determination of the phase settings $Ø_1$, $Ø_2$, $Ø_3$, $Ø_4$ for the pixels are determined to steer the light to the angle of 0 degrees. In FIG. 7, solid lines of the steered light represent the peak of each wave of the steered light as it reflects from the PLM 103. The dashed line from the center of the second pixel (e.g. at a phase $Ø_2$) represents a ray of light reflected by the second pixel; such a ray of light will be at a distance "D" (e.g. as defined below in Equation (15) from the ray of light coming from the first pixel (e.g. at a phase $Ø_1$), which will be a fraction of the wavelength λ. By trigonometry, D may be determined as follows (e.g. assuming the light rays are reflected from centers of the pixels):

$$D = p \sin \theta \quad \text{Equation (15)}$$

In beam steering, absolute phase values may be less relevant than phase differences (e.g. a difference in phase between neighboring pixels). In general, the ratio of a phase difference between adjacent pixels to 2π generally equals the ratio of D to λ; in particular, as one wavelength of light contains 2π radians of phase, the phase difference between two adjacent pixels is 2π*D/λ.

For example the distance of the wavelength λ relative to the ray of light coming from the first pixel is also depicted in FIG. 7. Hence:

$$\frac{\phi_2 - \phi_1}{2\pi} = \frac{D}{\lambda} \quad \text{Equation (16)}$$

Equation (16) may be rewritten as $$\Delta\phi = \frac{2\pi p \sin\theta}{\lambda} \quad \text{Equation (17)}$$

In Equation (17), ΔØ is the phase difference between neighboring pixels (e.g. $Ø_2 - Ø_1$).

Solving Equation (17) for the steering angle θ results in:

$$\theta = \sin^{-1} \frac{\Delta\phi * \lambda}{2\pi p} \quad \text{Equation (18)}$$

As phase is cyclic, repeating itself after 2π radians, the Nyquist limit means a maximum value for ΔØ is π radians. Hence a maximum steering angle $\theta_{MAX}$ may be determined from:

$$\theta_{MAX} = \sin^{-1} \frac{\lambda}{2p} \quad \text{Equation (19)}$$

For example, Equation (19) is similar to Equation (18) but with ΔØ set to π radians. For "typical" pixel sizes of phase-only modulators, and "typical" wavelengths (e.g. visible light and/or ultraviolet light), $\theta_{MAX}$ may be about 2.5°. As an example, when the PLM 103 has a pixel size of 8 um (e.g. microns), and the light source 131 comprises a red light source having a wavelength of 640 nm, $\theta_{MAX}$ may be 2.29°, as determined from Equation (19) (e.g. light may be steered ±2.29°). However, when the PLM 103 has a pixel size of 8 um (e.g. as with the red light source), and the light source 131 comprises a green light source having a wavelength of 525 nm would have a $\theta_{MAX}$ of 1.88°, as determined from Equation (19) (e.g. light may be steered ±1.88°). Similarly, when the PLM 103 has a pixel size of 8 um (e.g. as with the red light source and the green light source), and the light source 131 comprises a blue light source having a wavelength of 455 nm $\theta_{MAX}$ may be 1.63°, as determined from Equation (19) (e.g. light may be steered ±1.63°). Hence, for a given PLM 103, the beam steering may vary by color of light emitted by the light source 131.

In general, the PLM 103 is a pixelated device with a fill factor that is less than 100% (e.g. a typical fill factor may be about 94% for commercially available phase-only modulators). Hence, the PLM 103 will act as a diffractive blaze grating. The diffractive orders may be determined according to a blaze grating equation:

$$p(\sin\theta + \sin\theta_m) = m\lambda \quad \text{Equation (20)}$$

In Equation (20), m is a diffractive order.

The amplitude (A) of light at each diffractive order follows a diffraction equation:

$$A = \text{sinc}^2\left(\frac{fp\pi}{\lambda}\sin\theta_m\right) \quad \text{Equation (21)}$$

In Equation (21), f is a fill factor and represents a value less than 1. For example, a plot of amplitude vs steering angle for red light at 640 nm is depicted in FIG. 8. At the most extreme angles the 0 and $-1^{st}$ orders have approximately equal energy. All higher order diffraction elements, although present, have low enough amplitude that they may ignored in the present discussion.

Furthermore, it is understood that for most beam steering angles (0 to about 2.5°) the diffracted light will remain within the Premod image. This can be accounted for by modifying the above code snippet by determining $v_x$ and $v_y$ as follows:

$$v_x = \frac{((2x/hRes) - 1)}{((pixSize/2))} \quad \text{Equation (22)}$$

$$v_y = \frac{((2y/hRes) - 1)}{((pixSize/2))} \quad \text{Equation (23)}$$

Put another way, $v_x$ and $v_y$ of the above code snippet may be multiplied by a factor of two which takes into account reduced loss to diffraction, and no "zero order" artifacts commonly scene in other phase modulation schemes such as binary phase holograms. Put yet another way, the distance between the image plane 163 and the PLM 103 is selected such that both a central diffractive order (e.g. a "0" order as depicted in FIG. 8) and at least one further diffractive order (e.g. the −1 order as depicted in FIG. 8) of the PLM 103 are located within one or more of: a field of view of the relay optics 143; and within an active portion of the image as formed at the relay optics 143 by the PLM 103; the free space transfer function 271 is adjusted to account for the at least further one diffractive order (e.g. the amount of light collected by the relay optics 143 may be double compared to prior art systems).

Attention is next directed to FIG. 9 which depicts an example of the system 100 being used with a cinema projector system. For example, the projection optics 153 may be configured to project onto a screen 901, and the light source 131 may be a human visible light source. As the light source 131 may generally be monochromatic, the system 100 may be adapted to include three light sources 131 which may alternatively produce red, green and blue light which may be used to illuminate the PLM 103 in a series to produce red, green and blue frames of projected video, with the image data 151 adapted accordingly. Alternatively, the system 100 may be provided with three different light sources 131, (e.g. red, green and blue light sources), arranged relative to three respective PLMs 103 and three respective SLMs 101 with each "color" version of the system 100 concurrently generating respective red, green, and blue subframes of a video frame, using respective image data 151, and with the projection optics 153 combing the sub-frames for projection onto the screen 901. Regardless, in the system 100, less light is discarded than in prior art cinema projection systems that use an SLM as a pre-modulator (rather than the PLM 103) and hence the brightness of the light source 131 may be reduced, relative to prior art cinema projection systems, and/or a brighter image may be projected at the screen 901 for a similar brightness of the light source 131, relative to prior art cinema projection systems using a same amount of power and/or energy to operate the light source 131.

Attention is next directed to FIG. 10 which depicts an example of the system 100 being used with a three-dimensional printer light generation system. For example, the projection optics 153 may be configured to project (e.g. down) onto a surface of a thin layer of liquid polymer 1001 at a three-dimensional print bed 1002, and the light source 131 may be a UV light source and/or a light source that polymerizes and/or solidifies the liquid polymer 1001. While the system 100 is generally depicted as rotated by 90° with respect to FIG. 9, in other examples, the projection optics 153 may include a fold mirror, and the like, to project down onto the liquid polymer 1001 and the system 100 may otherwise be oriented similar to FIG. 9 (though any suitable respective orientation of the components of the system 100 are within the scope of the present specification). The image data 151 may represent layers of an object that is being three-dimensionally printed. For example, an image defined by the image data 151, that represents a first layer of an object may be projected by the projection optics 153 onto the liquid polymer 1001 which causes the areas of liquid polymer 1001 exposed to UV light to polymerize and thereby solidify to generate, for example, a first layer of the object being three-dimensionally printed. The three-dimensional print bed 1002 may then be lowered, as represented by the arrow 1003, and another thin layer of liquid polymer 1001 added to cover the first slice including the polymerized areas. The thickness each layer of the liquid polymer 1001 at the three-dimensional print bed 1002 may be any suitable thickness compatible with three-dimensional printing and/or thickness each layer of the liquid polymer 1001 at the three-dimensional print bed 1002 may be similar to a thickness of layer defined by the image data 151. A new image is then projected (e.g. an image defined by the image data 151, that represents a next layer of the object), polymerizing and/or solidifying the next layer of the object being three-dimensionally printed. This process may be repeated, building a three-dimensional structure of the object layer by layer. When completed the unexposed liquid polymer is drained away and the solid structure is optionally cured in an oven to complete the polymerization process.

In these examples, the magnitude of the light field determined from Equation (10) may represent an intensity of an ultraviolet (and the like) image onto the liquid polymer 1001 and can therefore be used to determine a cure time for the liquid polymer 1001 as a layer of an object is being three-dimensionally printed. Indeed, an advantage of using the system 100 as a three-dimensional printer light generation system lies in the cure time. In a traditional architecture the cure time per layer is fixed and relatively long. In the present examples, the cure time per layer may be inversely proportional to the density of the layer. With sparse layers, this cure time can be greatly reduced using the system 100, due to the higher intensity of light available, as compared to prior art techniques, thereby greatly reducing the time to three-dimensional print a single object.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A device comprising:
a spatial light modulator (SLM);
a phase light modulator (PLM), the SLM and the PLM arranged such that light reflected from the PLM illuminates the SLM; and
a controller having access to image data defining an image for projection, the controller configured to:
determine a target-destination wave, representative of the image, to be formed at an image plane of the PLM using the image data and a random seeding of spatial values of a spatially varying phase of the target-destination wave at the image plane, the image plane located between the PLM and the SLM;
determine a target-source wave to be formed at the PLM, based on: a free space transfer function between the PLM and the image plane; and the target-destination wave;
determine, from the target-source wave, a phase map for controlling the PLM to form the image; and
control the PLM using the phase map.

2. The device of claim 1, wherein the controller is further configured to:
determine a real-source wave, representative of an actual source wave formed by the PLM when controlled using the phase map, the real-source wave determined using the phase map;
determine a real-destination wave formed at the image plane due to the real-source wave propagating through space to the image plane, the real-destination wave based on: the free space transfer function between the PLM and the image plane; and the real-source wave;
determine a spatially varying representation of the real-destination wave;
determine SLM data for controlling the SLM based on: the image data; the spatially varying representation of the real-destination wave; and a pixel spread function representing pixel spread between the image plane and the SLM; and
control the SLM using the SLM data.

3. The device of claim 2, wherein the SLM data is further based on a warping function that represents one or more of: spatial image transformation; keystoning; image rotation; and magnification.

4. The device of claim 2, wherein the controller is further configured to repeat, at least once, a determination of the real-destination wave by:
again determining the target-destination wave using the image data, and with spatial values of the spatially varying phase determined from the real-destination wave, as previously determined, instead of the random seeding; and
using the target-destination wave, as again determined, to again determine the target-source wave.

5. The device of claim 4, wherein the controller is further configured to iteratively repeat determining the real-destination wave until one or more of: a predetermined number of iterations occurs; and an error function is less than a threshold value.

6. The device of claim 1, further comprising a light source for illuminating the PLM.

7. The device of claim 1, further comprising relay optics between the image plane and the SLM, the relay optics contributing, at least in part, to a pixel spread function between the image plane and the SLM, the pixel spread function used to determine SLM data for controlling the SLM.

8. The device of claim 1, further comprising relay optics between the image plane and the SLM, wherein a distance between the image plane and the PLM is selected such that both a central diffractive order and at least one further diffractive order of the PLM are located within one or more of: a field of view of the relay optics; and within an active portion of the image as formed at the relay optics by the PLM.

9. The device of claim 1, further comprising relay optics between the image plane and the SLM, wherein the free space transfer function based on a distance between the PLM and the image plane, wherein the distance between the image plane and the PLM is selected such that both a central diffractive order and at least one further diffractive order of the PLM are located within one or more of: a field of view of the relay optics; and within an active portion of the image as formed at the relay optics by the PLM, and wherein the controller is further configured to adjust the free space transfer function to account for the at least further one diffractive order.

10. A method comprising:

determining, at a device, a target-destination wave, representative of an image, to be formed at an image plane of phase light modulator (PLM) using image data, the image data defining the image for projection, and a random seeding of spatial values of a spatially varying phase of the target-destination wave at the image plane, the image plane located between the PLM and spatial light modulator (SLM), the SLM and the PLM arranged such that light reflected from the PLM illuminates the SLM;

determining, at the device, a target-source wave to be formed at the PLM, based on: a free space transfer function between the PLM and the image plane; and the target-destination wave;

determining, at the device, from the target-source wave, a phase map for controlling the PLM to form the image; and controlling, at the device, the PLM using the phase map.

11. The method of claim 10, further comprising:

determining, at the device, a real-source wave, representative of an actual source wave formed by the PLM when controlled using the phase map, the real-source wave determined using the phase map;

determining, at the device, a real-destination wave formed at the image plane due to the real-source wave propagating through space to the image plane, the real-destination wave based on: the free space transfer function between the PLM and the image plane; and the real-source wave;

determining, at the device, a spatially varying representation of the real-destination wave;

determining, at the device, SLM data for controlling the SLM based on: the image data; the spatially varying representation of the real-destination wave; and a pixel spread function representing pixel spread between the image plane and the SLM; and controlling, at the device, the SLM using the SLM data.

12. The method of claim 11, wherein the SLM data is further based on a warping function that represents one or more of: spatial image transformation; keystoning; image rotation; and magnification.

13. The method of claim 11, further comprising repeating, at least once, a determination of the real-destination wave by:

again determining the target-destination wave using the image data, and with spatial values of the spatially varying phase determined from the real-destination wave, as previously determined, instead of the random seeding; and using the target-destination wave, as again determined, to again determine the target-source wave.

14. The method of claim 13, further comprising iteratively repeating determining the real-destination wave until one or more of: a predetermined number of iterations occurs; and an error function is less than a threshold value.

15. The method of claim 10, further comprising illuminating the PLM using a light source.

16. The method of claim 10, further comprising:

using a pixel spread function determine SLM data for controlling the SLM, wherein relay optics are located between the image plane and the SLM, the relay optics contributing, at least in part, to the pixel spread function between the image plane and the SLM.

17. The method of claim 10, further comprising:

selecting a distance between the image plane and the PLM such that both a central diffractive order and at least one further diffractive order of the PLM are located within one or more of: a field of view of relay optics between the image plane and the SLM; and within an active portion of the image as formed at the relay optics by the PLM.

18. The method of claim 10, wherein the free space transfer function is based on a distance between the PLM and the image plane, wherein the distance between the image plane and the PLM is selected such that both a central diffractive order and at least one further diffractive order of the PLM are located within one or more of: a field of view of relay optics between the image plane and the SLM; and within an active portion of the image as formed at the relay optics by the PLM, and wherein the method further comprises adjusting free space transfer function to account for the at least further one diffractive order.

19. A non-transitory computer-readable medium storing a computer program, wherein execution of the computer program is for:

determining, at a device, a target-destination wave, representative of an image, to be formed at an image plane of phase light modulator (PLM) using image data, the image data defining the image for projection, and a random seeding of spatial values of a spatially varying phase of the target-destination wave at the image plane, the image plane located between the PLM and spatial light modulator (SLM), the SLM and the PLM arranged such that light reflected from the PLM illuminates the SLM;

determining, at the device, a target-source wave to be formed at the PLM, based on: a free space transfer function between the PLM and the image plane; and the target-destination wave;

determining, at the device, from the target-source wave, a phase map for controlling the PLM to form the image; and controlling, at the device, the PLM using the phase map.

20. The non-transitory computer-readable medium of claim 19, wherein execution of the computer program is further for:

determining, at the device, a real-source wave, representative of an actual source wave formed by the PLM when controlled using the phase map, the real-source wave determined using the phase map;

determining, at the device, a real-destination wave formed at the image plane due to the real-source wave propagating through space to the image plane, the real-destination wave based on: the free space transfer function between the PLM and the image plane; and the real-source wave;

determining, at the device, a spatially varying representation of the real-destination wave;

determining, at the device, SLM data for controlling the SLM based on: the image data; the spatially varying representation of the real-destination wave; and a pixel spread function representing pixel spread between the image plane and the SLM; and controlling, at the device, the SLM using the SLM data.

* * * * *